(12) United States Patent
Rebala et al.

(10) Patent No.: US 12,387,625 B2
(45) Date of Patent: Aug. 12, 2025

(54) NON-FUNGIBLE ANTI-COUNTERFEIT PHOTO-CHROMIC NANO-MICRO THREE-DIMENSIONAL TAGS/LABELS

(71) Applicants: Sudhir Reddy Rebala, East Windsor, NJ (US); Senthil Kumar Chinnusami, East Windsor, NJ (US)

(72) Inventors: Sudhir Reddy Rebala, Chennai (IN); Senthil Kumar Chinnusami, Chennai (IN)

( * ) Notice: Subject to any disclaimer, the term of this patent is extended or adjusted under 35 U.S.C. 154(b) by 0 days.

(21) Appl. No.: 18/754,223

(22) Filed: Jun. 26, 2024

(65) Prior Publication Data
US 2024/0346958 A1 Oct. 17, 2024

Related U.S. Application Data

(63) Continuation of application No. PCT/IB2023/050346, filed on Jan. 14, 2023.

(30) Foreign Application Priority Data

Nov. 22, 2022 (IN) .............................. 202241066886

(51) Int. Cl.
G09F 3/00 (2006.01)
B41M 1/12 (2006.01)
(Continued)

(52) U.S. Cl.
CPC ............. *G09F 3/0297* (2013.01); *B41M 1/12* (2013.01); *B41M 3/142* (2013.01);
(Continued)

(58) Field of Classification Search
CPC .......... G09F 3/0297; G09F 2003/0202; G09F 2003/0255; G09F 2003/0257;
(Continued)

(56) References Cited

U.S. PATENT DOCUMENTS

| 2015/0317955 A1* | 11/2015 | Tanaka | G09G 5/37 |
| | | | 235/494 |
| 2015/0347889 A1* | 12/2015 | Nosaka | G06K 1/12 |
| | | | 235/494 |
| 2016/0092760 A1* | 3/2016 | Tanaka | G06K 19/06103 |
| | | | 235/494 |

* cited by examiner

*Primary Examiner* — Daniel A Hess
(74) *Attorney, Agent, or Firm* — Novel Patent Services

(57) ABSTRACT

"Non-fungible anti-counterfeit photo-chromic nano-micro three-dimensional tags/labels are designed in such a manner that duplication and counterfeiting of the labels are prevented. The label comprises of a frame quick response (QR) code part (103), which surrounds a three-dimensional sticker part, which consists of a foundation paper (113) made of cellulose, a non-fungible three-dimensional (3D) structure and a fade-resistant transparent plastic sheet (201). The structure consists of multi-colored micro particles (107), silica-infused 3D macro particles (109) and the photo-chromic nano particles (111). The sheet is laminated on the paper after application of dense coating of particles. The code part contains all information about the sticker part and is scannable by a specific application module, which allows to scan the code part to recognize the data in the code part, to direct the data to a customer's database server, which instantly maps the code data with the scanned image that is stored in its database to verify label authenticity. If the data matches with each other, the backend server sends a message to the application module that the product is genuine. In case of any variation between the scanned and stored data, the system sends a counterfeit alert to the application user, instantly requests to take the GPS coordinates of the location and sends report to manufacturer's designated contact.

10 Claims, 3 Drawing Sheets

(51) Int. Cl.
  *B41M 3/14* (2006.01)
  *B42D 25/378* (2014.01)
  *G06K 7/14* (2006.01)
  *G06Q 30/018* (2023.01)
  *G09F 3/02* (2006.01)

(52) U.S. Cl.
  CPC ......... *B42D 25/378* (2014.10); *G06K 7/1417* (2013.01); *G06Q 30/0185* (2013.01); *G09F 2003/0202* (2013.01); *G09F 2003/0255* (2013.01); *G09F 2003/0257* (2013.01)

(58) Field of Classification Search
  CPC ....... B42D 25/378; B41M 1/12; B41M 3/142; G06K 7/1417; G06Q 30/0185
  USPC ....................................................... 235/380
  See application file for complete search history.

NON-FUNGIBLE ANTI-COUNTERFEIT PHOTO-CHROMIC NANO-MICRO THREE-DIMENSIONAL TAGS/LABELS

FIELD OF INVENTION

The present invention relates to a non-fungible anti-counterfeit photo-chromic nano-micro three-dimensional tags/label, which is designed in such a manner that it allows facilitation of instant authentication of the label and also alerting about the counterfeits with the GPS coordinates in a simple and effective manner, thereby preventing the duplication of labels and also preventing counterfeiting of the labels.

BACKGROUND OF INVENTION

In recent years, labels were primarily invented for identification, authentication and authorization purposes and to obtain or to transfer the information from one place or resource to another in a precise and secure manner. The usage of labels facilitates various functional identification requirements, making daily tasks easier for human beings. So, the need for labels on entities and objects is tremendously increasing all around.

Traditionally, the labels are made up of sandwiching the layers of face stock, adhesive and topcoat. The face stock is a printable surface which contains the information. Previously paper labels were used but they were not reliable for a long term use. So, currently in market many film based face-stocks like polyethylene, polypropylene, polyester and vinyl are used for their sturdiness towards the outdoor application, as they are resistant to tearing, chemicals, temperatures, and UV exposure, whereas the adhesive plays an important in the attachment of the labels over the surface. Many forms are available based upon the sector of usage. The top coat lies in the surface of face-stock for additional protection.

However, the above mentioned labels face several compromising threats such as counterfeiting, replication and duplication which severely undermines the quality, affects the brand value and cause hazard to the consumers. These can be sort out by using anti-counterfeiting labels.

The anti-counterfeiting labels provides high level of protection to any product, which prevents them against tampering, illegal handling and counterfeiting practices and eventually blocks counterfeiters from copying or faking the labels. These anti-counterfeiting labels, have essential security features such as encrypted codes, random patterns, unified QR codes, RFID tags, hologram stickers and tamper proof seals.

A unified QR codes often contain data for a locator, identifier, or tracker which points to a website or application. Similarly, RFID is one of the automatic identification and data capturing method using the radio frequency which helps to track the attached product. Hologram stickers are generally three-dimensional images, which is produced by high-technology optical laser-recording techniques. A hologram has several layers of impressions of the master design. At present, hologram sticker provides a partially-reliable solution for product and brand protection.

As the technology develops day by day, the presently available high secure anti-counterfeiting labels have lost their utility as they can be replicated with the help of high-quality digital scanning and printing machines. This makes the products using them prone to duplication and counterfeiting.

Some of the prior art are disclosed below:

CN103617763A discloses the anti-counterfeit label comprising of a label body, a three-dimensional anti-counterfeit area made out of any type of three-dimensional embodiments and a numbering area containing a set of code, used for verifying the originality which are arranged on the same side of the label body comprising of color latex paint and other chromographic inks and organic matter chippings are made to adhere to compared with an anti-counterfeit label in the prior art so that the present invention cannot be copied easily and the indiscriminate use are avoided, where the uniqueness effect is achieved. CN210337417U discloses the invisible anti-counterfeiting impregnated paper comprises a pattern printed on one side of the paper and the adhesive film is used for coating the raw paper and the image-text printing layer with a surface of transparent thin film layer that provides the plurality and the invisible fluorescent anti-counterfeiting marks are printed on the transparent thin film strips to form an invisible anti-counterfeiting Layer with the wear-resistant adhesive film layer that solves easy to tear off and scratch ability.

Accordingly, there is a need for a non-fungible anti-counterfeit photo-chromic nano-micro three-dimensional tags/label of the present invention, which is designed in such a manner that it allows facilitation of instant authentication of the label and also alerting about the counterfeits with the GPS coordinates in a simple and effective manner, thereby preventing the duplication of labels and also preventing counterfeiting of the labels.

OBJECT OF INVENTION

The main object of the invention is to provide a non-fungible anti-counterfeit photo-chromic nano-micro three-dimensional tags/label of the present invention, which is designed in such a manner that it allows facilitation of instant authentication of the label and also alerting about the counterfeits with the GPS coordinates in a simple and effective manner, thereby preventing the duplication of labels and also preventing counterfeiting of the labels.

SUMMARY OF INVENTION

The non-fungible anti-counterfeit photo-chromic nano-micro three-dimensional tags/label of the present invention prevents the duplication of labels and also preventing the counterfeiting of labels in a simple and effective manner.

The label of the present invention comprises of a three-dimensional sticker part and a frame quick response (QR) code part, which surrounds the three-dimensional sticker part. The sticker part which consists of a foundation paper made of cellulose, a non-fungible three-dimensional (3D) structure and a fade-resistant transparent plastic sheet. The three-dimensional structure consists of multi-colored micro particles, silica-infused 3D macro particles and the photo-chromic nano particles. The sheet is laminated on the foundation paper after application of dense coating of particles.

The frame code part contains all information about the sticker part and is scannable by a specific application module, which allows to scan the code part to recognize the data in the code part, to direct the data to a customer's database server, which instantly maps the code data with the scanned image that is stored in its database to verify label authenticity. If the data matches with each other, the backend server sends a message to the application module that the product is genuine. In case of any variation between the scanned and stored data, the system sends a counterfeit alert to the application user, instantly requests to take the GPS coordinates of the location and sends report to manufacturer's designated contact.

DETAILED DESCRIPTION OF INVENTION

The non-fungible anti-counterfeit photo-chromic nano-micro three-dimensional tags/label of the present invention is designed in such a manner that it allows facilitation of instant authentication of the label and also alerting about the counterfeits with the GPS coordinates in a simple and effective manner.

With reference to FIG. 1 and FIG. 5, the label of the present invention comprises of a three-dimensional sticker part and a frame quick response (QR) code part (103), which surrounds the three-dimensional sticker part. The three-dimensional sticker part consists of a foundation paper (113) made of cellulose, a non-fungible three-dimensional (3D) structure and a fade-resistant transparent plastic sheet (201) as shown in FIG. 3. The length and breadth of the frame QR code part are variable. The length and breadth of three-dimensional sticker part are variable. With reference to FIG. 4, elevation (105) of the three-dimensional sticker part is in the range of 0.1-1.0 mm.

The foundation paper is printed in multi-color at random without following any set pattern or algorithm thereby creating a non-duplicatable color mosaic background for the three-dimensional structure. The non-fungible three-dimensional structure consists of multi-colored micro particles (107), silica-infused 3D macro particles (109) and the photo-chromic nano particles (111).

The photochromic nano particles is coated on the foundation paper in the form of a random screen print and coated with invisible photochromic ink that appears only under a flash light or a torch light. The multi-colored micro particles are dispersed at random on the foundation paper using an immobilizing epoxy mix. The silica-infused macro particles are affixed to the foundation paper at random without following any set pattern or algorithm. The silica-infused macro particles are made out of glass, textiles, wood or paper and provides a complex three-dimensional structure.

The fade-resistant transparent plastic sheet is laminated on the foundation paper after application of dense coating of the photochromic nano particles, multi-colored micro particles and silica-infused 3D macro particles on the foundation paper.

The frame QR code part is scannable by a specific application module, which is downloadable in a smartphone or a device of an user. The frame QR code part allows quick capture of the data of the product in which the label of the present invention is stuck, by the phone app and/or device app. The frame QR code contains all the information about the three-dimensional sticker part, and provides the coordinates to a system e.g. smartphone, that reads the QR code in the frame QR code part. The frame QR code part contains the data of the product on which it is used, such as manufacturing details, company's name, etc.

The specific application module makes to scan the frame QR code part using a camera. A backend server recognizes the data in the frame QR code part and directs the data to a customer's database server, which instantly maps the frame QR code data with the scanned image that is stored in its database to verify the authenticity of the label. If the data matches with each other, the backend server sends a message to the application module that the product is genuine. In case of any variation between the scanned data and stored data, the system sends a counterfeit alert to the application user, instantly requests to take the GPS coordinates of the location and sends the report to the manufacturer's designated contact. The application module helps us to gather data on the interests and behavior of the end consumer.

With reference to FIG. 2, the multi-colored micro particles (107), silica-infused 3D macro particles (109) and the photo-chromic nano particles (111) are laminated by a fade-resistant transparent sheet, which is made out of plastic.

A batch is created by a computer program based on a production batch size of a product on which the label of the present invention is stuck. A serial number is suffixed to the batch variable to make each and every frame QR code completely unique, thereby preventing counterfeit of the product.

Method for production of label of the present invention, comprising the steps of:
 a. producing three-dimensional sticker parts and stacking the same in a gumming machine, in a label manufacturing unit;
 b. printing frame QR code part for each three-dimensional sticker part and fixing the three-dimensional sticker part at the center of each frame QR code part so as to obtain a label of the present invention;
 c. scanning the finished label that contains both the three-dimensional sticker part and the frame QR code part and storing the corresponding data in a customer's database either on physical server or cloud; and
 d. shipping the manufactured label to a customer's manufacturing plant and permanently affixing the label on the product packing or the products.

Method for verifying authenticity of a product and for sending counterfeit alert using a label of the present invention, comprising the steps of:
 a. downloading a specific application module in a smartphone and using the specific application module so as to check the authenticity of a product in which the label of the present invention is stuck, if required by the end consumers;
 b. keeping a camera in the smartphone to face the label stuck on the product so that the application module instantly recognizes the data in the frame QR Code part, either on its own or the immediate server or system or cloud connected at the backend so as to understand the manufacturer and batch information and to instantly direct the data to the customer's database server which instantly maps the data in the frame QR code part with the scanned image that is stored in its database to verify the authenticity of the label;
 c. if the data matches, making the server to send a message to the application module, that the product is genuine, in case of any variation, a counterfeit alert is sent to the application module user and instantly requests to take the GPS coordinates of the location and sends the report to the manufacturer's designated contact; and
 d. preparing consolidated reports, which are sent to customers.

REFERENCE NUMERALS

Figure 1:
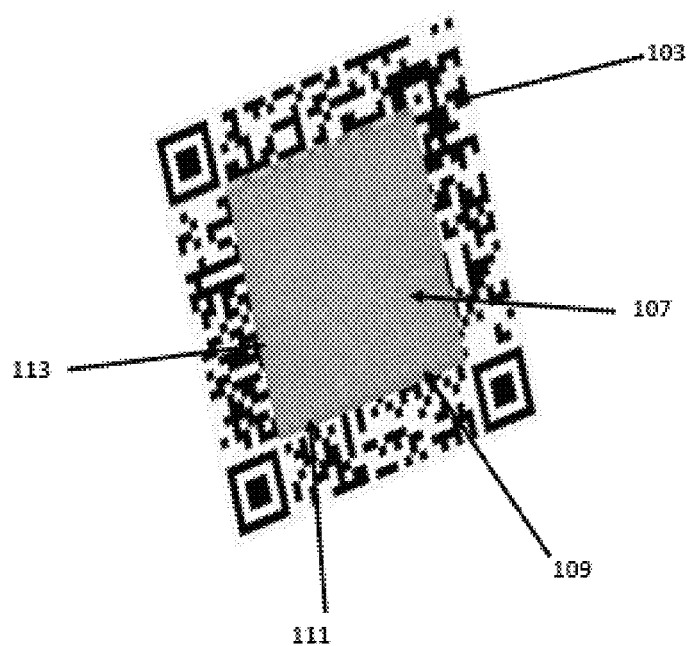
FIG. 1 shows an isometric view of non-fungible anti-counterfeit photo-chromic nano-micro three-dimensional tags/labels of the present invention.
Figure 2:
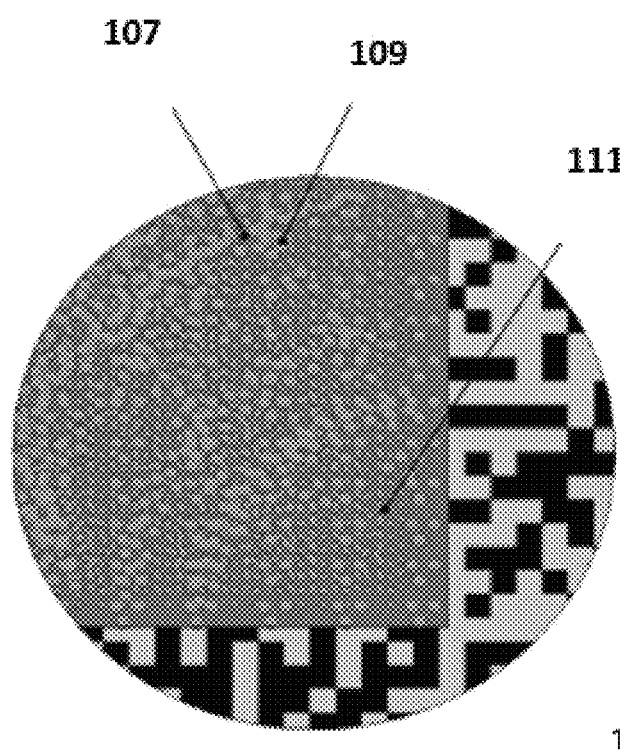
FIG. 2 shows a detailed sectional view of particles in the non-fungible anti-counterfeit photo-chromic nano-micro three-dimensional tags/labels of the present invention.
Figure 3:
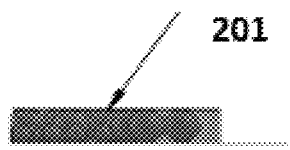
FIG. 3 shows a front view of a fade-resistant transparent sheet that is laminated on a foundation paper after application of dense coating of multi-colored micro particles, silica-infused 3D macro particles and photo-chromic nano particles in the non-fungible anti-counterfeit photo-chromic nano-micro three-dimensional tags/labels of the present invention.
Figure 4:
FIG. 4 shows a front view of an elevation in a three-dimensional sticker part in the non-fungible anti-counterfeit photo-chromic nano-micro three-dimensional tags/labels of the present invention.
Figure 5:
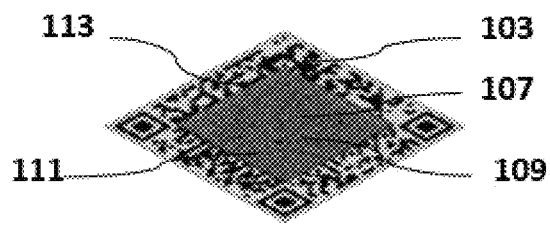
FIG. 5 shows a top perspective view of the non-fungible anti-counterfeit photo-chromic nano-micro three-dimensional tags/labels of the present invention.

103 Frame QR code part
105 Elevation
107 Multi-colored micro particles
109 Silica-infused 3D macro particles
111 Photo-chromic nano particles
113 Foundation paper
201 Fade-resistant transparent plastic sheet

We claim:

1. Non-fungible anti-counterfeit photo-chromic nano-micro three-dimensional tags/labels, comprising of a
    a. a three-dimensional sticker part consisting of a foundation paper (113) made of cellulose, a non-fungible three-dimensional (3D) structure and a fade-resistant transparent plastic sheet (201); and
    b. a frame quick response (QR) code part (103) surrounding the three-dimensional sticker part and scannable by a specific application module, which is downloadable in a smartphone or a device of an user for scanning the data in the frame QR code part;
    wherein the non-fungible three-dimensional structure consists of multi-colored micro particles (107), silica-infused 3D macro particles (109) and the photo-chromic nano particles (111);
    wherein the fade-resistant transparent plastic sheet is laminated on the foundation paper after application of dense coating of the particles;
    wherein a backend server recognizes the data in the frame QR code part and directs the data to a customer's database server, which instantly maps the frame QR code data with the scanned image that is stored in its database to verify the authenticity of the label;
    wherein the backend server sends a message to the application module that a product (in which the label is stuck) is genuine, if the data matches with each other, and sends a counterfeit alert to the user of the application, instantly requests to take the GPS coordinates of the location and sends the report to the manufacturer's designated contact, in case of any variation between the scanned data and stored data.

2. The labels as claimed in claim 1, wherein the length and breadth of the frame QR code part and the three-dimensional sticker part are variable and elevation (105) of the three-dimensional sticker part is in the range of 0.1-1.0 mm.

3. The labels as claimed in claim 1, wherein the foundation paper is printed in multi-color at random without following any set pattern or algorithm thereby creating a non-duplicatable color mosaic background for the three-dimensional structure.

4. The labels as claimed in claim 1, wherein the photochromic nano particles are coated on the foundation paper in the form of a random screen print and coated with invisible photochromic ink that appears only under a flash light or a torch light.

5. The labels as claimed in claim 1, wherein the multi-colored micro particles are dispersed at random on the foundation paper using an immobilizing epoxy mix.

6. The labels as claimed in claim 1, wherein the silica-infused macro particles are affixed to the foundation paper at random without following any set pattern or algorithm, are made out of glass, textiles, wood or paper and provides a complex three-dimensional structure.

7. The labels as claimed in claim 1, wherein the frame QR code part contains the data of the product on which it is used, such as manufacturing details, company's name, etc.

8. The labels as claimed in claim 1, wherein the frame QR code part contains a specific serial number suffixed to a batch variable based on a production batch size of the product on which the label is stuck.

9. Method for production of labels, comprising the steps of:
    a. producing three-dimensional sticker parts and stacking the same in a gumming machine, in a label manufacturing unit;
    b. printing frame QR code part for each three-dimensional sticker part and fixing the three-dimensional sticker part at the center of each frame QR code part so as to obtain a label of the present invention;
    c. scanning the finished label that contains both the three-dimensional sticker part and the frame QR code part and storing the corresponding data in a customer's database either on physical server or cloud; and
    d. shipping the manufactured label to a customer's manufacturing plant and permanently affixing the label on the product packing or the products.

10. Method for verifying authenticity of a product and for sending counterfeit alert using a label of the present invention, comprising the steps of:
    a. downloading a specific application module in a smartphone and using the specific application module so as to check the authenticity of a product in which the label of the present invention is stuck, if required by the end consumers;
    b. keeping a camera in the smartphone to face the label stuck on the product so that the application module instantly recognizes the data in the frame QR Code part, either on its own or the immediate server or system or cloud connected at the backend so as to understand the manufacturer and batch information and to instantly direct the data to the customer's database server which instantly maps the data in the frame QR code part with the scanned image that is stored in its database to verify the authenticity of the label;
    c. if the data matches, making the server to send a message to the application module, that the product is genuine, in case of any variation, a counterfeit alert is sent to the application module user and instantly requests to take the GPS coordinates of the location and sends the report to the manufacturer's designated contact; and
    d. preparing consolidated reports, which are sent to customers.

* * * * *